UNITED STATES PATENT OFFICE.

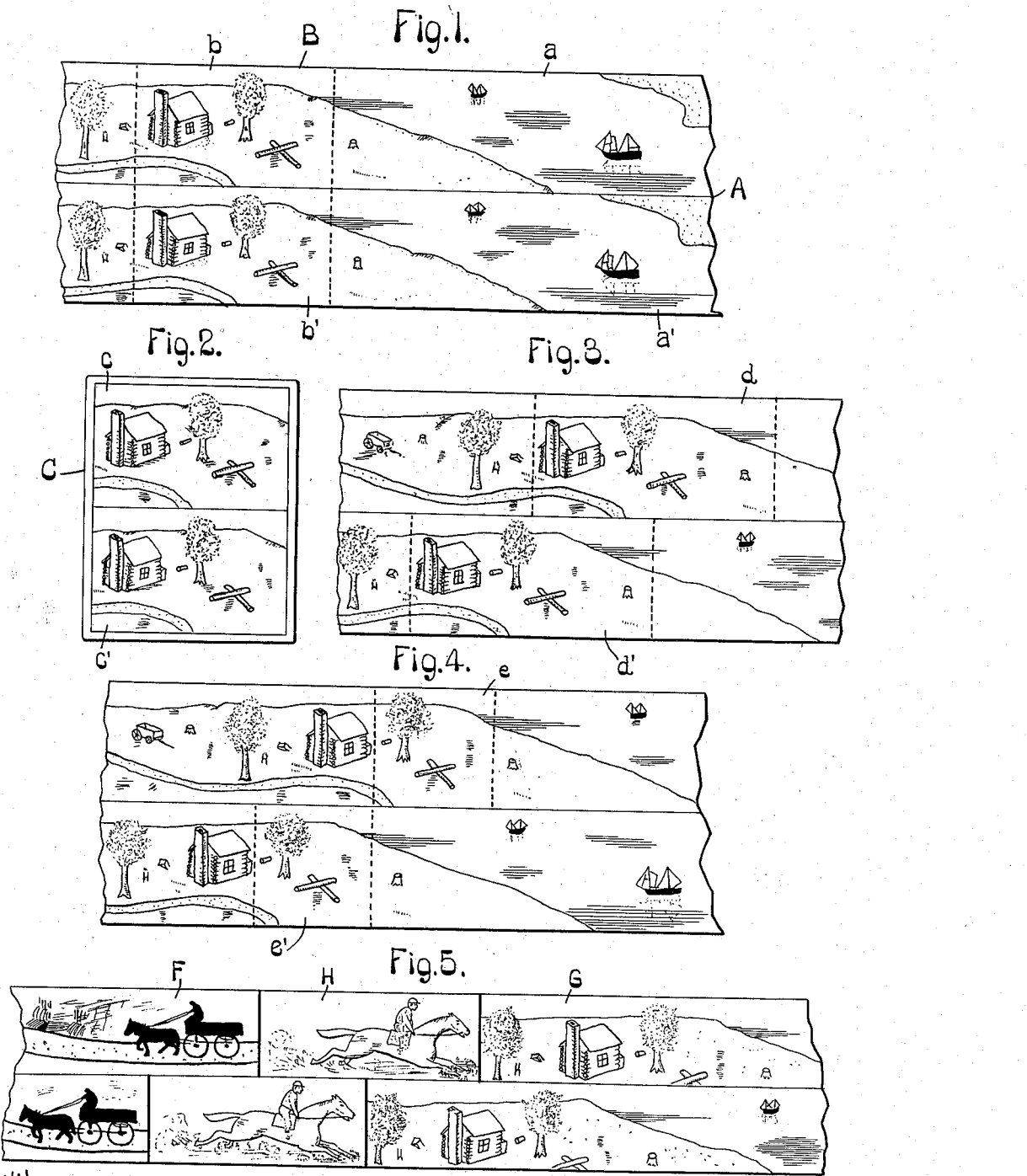

EDWIN P. CROCKER, OF ROCHESTER, NEW YORK, AND A B PAYNE, OF WEBSTER GROVES, MISSOURI; SAID CROCKER ASSIGNOR TO SAID PAYNE.

PICTURE FOR STEREOSCOPES AND SIMILAR DEVICES.

No. 899,862.     Specification of Letters Patent.     Patented Sept. 29, 1908.

Application filed January 8, 1908. Serial No. 409,779.

*To all whom it may concern:*

Be it known that we, EDWIN P. CROCKER and A B PAYNE, both citizens of the United States, residing at Rochester, New York, and Webster Groves, Missouri, respectively, have invented a certain new and useful Improvement in Pictures for Stereoscopes and Similar Devices, of which the following is a full and exact description, such as will enable others skilled in the art to which it appertains to make and use the same, reference being had to the accompanying drawings, forming part of this specification, in which—

Figure 1 illustrates one of our improved panoramic pictures in which the picture units are arranged in the same vertical plane; Fig. 2 illustrates one of our improved single pictures which consists of a card provided with picture units that are arranged in the same vertical plane; Figs. 3 and 4 illustrate panoramic pictures wherein the picture units are arranged in a slightly different manner from that shown in Fig. 1; and Fig. 5 illustrates a picture that is made up of panoramic views and individual pictures.

This invention relates to pictures or views such as are used in stereoscopes and similar devices.

The pictures that have heretofore been used in stereoscopes were each composed of two substantially identical picture units arranged side by side in the same horizontal plane so that when examined through the lenses of the stereoscope said picture units would form a single picture. The two picture units were mounted on a card which was arranged in front of the lenses of the stereoscope and when the picture which said two picture units formed had been examined the card was removed and a different card placed in position. As the separation or distance between the human eyes is at the most, three inches, and as the eyes of the person looking at the picture had to focus on the centers of the picture units, it was impossible to use picture units over three inches wide owing to the fact that said units were arranged side by side in the same horizontal plane. Consequently, the pictures which have heretofore been used in stereoscopes and similar devices were limited to views of three inches or less in width. Furthermore, said pictures had to be examined one at a time so that it was impossible to display a number of views in succession and thus produce a panoramic effect.

The main object of our present invention is to provide a stereoscope picture in which the two substantially identical picture units are so arranged relatively to each other that the stereoscopic field of vision is increased from approximately three inches up to or over five inches, thereby permitting the use of picture units of over three inches in width.

Another object of our invention is to provide a panoramic stereoscope picture which is made up of a plurality of pairs of substantially identical picture units, the two units which form each picture being so arranged relatively to each other, that a continuous series of views will be displayed when the film or strip upon which the picture units are mounted is passed through the visual plane.

Briefly described, our improved stereoscope picture consists of two substantially identical picture units arranged in different horizontal planes and adapted to be used in a stereoscope which is provided with means for deflecting the rays of light in such a manner that both picture units will appear to be in the same horizontal plane and directly opposite the eyes of the person viewing same. By arranging the two picture units of each picture in different horizontal planes and deflecting the light in the manner described, we are able to use picture units of over three inches in width because said picture units can overlap or be arranged in the same vertical plane. Another advantage of arranging the picture units of each picture in different horizontal planes is that in a panoramic view the different pictures which form the panorama can be arranged close together with no intervening blank spaces so that when the film or strip which carries the pictures is moved through the visual plane a continuous series of pictures will be displayed and thus produce a perfect panoramic effect. If the picture units of each picture were arranged side by side in the same horizontal plane as has heretofore been the custom, it would be impossible to produce a perfect panoramic effect by mounting a number of different pictures or views on a movable strip or film because when the strip moved through the visual plane one picture unit of one picture would be opposite the left eye of the person looking through the scope at the same time one picture unit of the adjacent picture was opposite the right eye.

Referring to the drawings which illustrate our invention, Fig. 1 shows a stereoscope picture composed of a plurality of views or pictures each of which consists of two picture units arranged in different horizontal planes. In the form of our invention shown in Fig. 1, the upper picture unit $a$ of the view A is arranged directly above or in the same vertical plane as the lower picture unit $a'$ of said view, and in the adjacent picture or view B the upper and lower picture units $b$ and $b'$, respectively, are also arranged in the same vertical plane. The picture shown in Fig. 1 is adapted to be used in a stereoscope provided with means for swerving or deflecting the path of the light from the left lens toward the right and upwardly, and the path of the light from the right lens toward the left and downwardly, thereby causing both picture units to appear to be in the same horizontal plane and directly opposite the lenses. As the picture units of each picture or view are not located directly opposite the eyes of the person looking through the stereoscope it is possible to have the picture units over three inches wide; whereas, if they were located directly opposite the lenses of the stereoscope, as in the stereoscope pictures which have heretofore been in use, it would be impossible to have the picture units over three inches wide because the distance between the eyes of a person are, at the most, only three inches, as previously stated.

As shown clearly in Fig. 1, the views A and B are arranged close together with no blank space between them so that when the strip or film which carries said pictures is moved transversely past the lenses of the stereoscope, one picture will merge into the other and thus produce a perfect panorama. It is preferable to mount both picture units of each view or picture on the same strip or film but it is not absolutely necessary to mount the picture units in this manner as the same result would be produced if the upper and lower picture units were mounted on different strips which traveled transversely of the lenses at the same rate of speed. It is also immaterial, so far as our broad idea is concerned, whether the strip be in the form of a photographic film or merely a strip on which pictures are printed or on which photographic prints are mounted.

In Fig. 2 we have shown an individual picture that consists of upper and lower picture units $c$ and $c'$, respectively, arranged in the same vertical plane and mounted on a card C. The card is adapted to be placed in the holder of the stereoscope which is located in front of the lenses and the main advantage of this form of picture is that it increases the stereoscopic field of vision, as previously described.

Instead of arranging the picture units one above the other in the same vertical plane, as shown in Figs. 1 and 2, the upper and lower picture units $d$ and $d'$, respectively, can overlap or be arranged in different vertical planes, as shown in Fig. 3. When the picture units are arranged in this manner we are able to use even wider picture units than in the forms shown in Figs. 1 and 2 for the distance between the centers of the upper and lower picture units of each picture is only three inches, which, as previously stated, is the distance that has been found to be optically feasible for the separation of the centers of the picture units of stereoscope pictures. A picture of this form can also be used in a stereoscope which is only provided with means for deflecting the light from one lens of the stereoscope upwardly and from the other lens of the stereoscope downwardly so as to cause the picture units to appear as though they were arranged in the same horizontal plane and directly opposite the lenses of the stereoscope.

In Fig. 4 we have shown a picture wherein the upper and lower picture units $e$ and $e'$ do not overlap but are arranged in different vertical planes, and in Fig. 5 we have illustrated a picture that comprises long panoramic views F and G and a narrow view H arranged between them, thus illustrating that our improved stereoscope picture is not limited to panoramic views but can be made up of panoramic views and views of individual objects.

Having thus described our invention, what we claim as new and desire to secure by Letters Patent is:

1. A picture adapted to be used in a stereoscope or similar device, and comprising substantially identical picture units arranged in different horizontal planes and in the same vertical plane, said picture units being wider than the distance between the centers of the lenses of the stereoscope; substantially as described.

2. A picture adapted to be used in a stereoscope or similar device, and comprising a pair of picture units arranged in different horizontal planes and having portions thereof lying in the same vertical plane; substantially as described.

3. A picture adapted to be used in a stereoscope or similar device, and comprising a strip which is provided with a continuous view or picture that is made up of two series of units arranged in different horizontal planes, the picture units of each series being located close together with no blank spaces between them; substantially as described.

4. A picture adapted to be used in a stereoscope or similar device, and which comprises a strip provided with a series of views or pictures, each of which is made up of two picture units that are arranged in different horizontal planes, the upper and lower picture units of said views being arranged close together with no blank spaces between them; substantially as described.

5. A picture adapted to be used in a stereoscope or similar device, and comprising a strip that is provided with individual pictures and panoramic views arranged adjacent each other and each of which consists of two picture units located in different horizontal planes, the upper and lower units of said pictures and views being arranged close together so that no blank spaces are between them; substantially as described.

In testimony whereof, I hereunto affix my signature in the presence of two witnesses, this 29 day of November, 1907.

EDWIN P. CROCKER.

Witnesses:
CHESTER A. JORDAN,
GEO. S. MCMILLAN.

In testimony whereof, I hereunto affix my signature in the presence of two witnesses, this 27th day of December, 1907.

A B PAYNE.

Witnesses:
J. E. GOUTREMONT,
A. FRANK WARREN.